US010688628B2

United States Patent
Xu et al.

(10) Patent No.: US 10,688,628 B2
(45) Date of Patent: Jun. 23, 2020

(54) FIXING STRUCTURE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Ze-Feng Xu, Shenzhen (CN); Jia-Yu Lv, Shenzhen (CN); Zhao-Guo Fu, Shenzhen (CN); Li-Chin Lu, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 230 days.

(21) Appl. No.: 15/870,866

(22) Filed: Jan. 13, 2018

(65) Prior Publication Data

US 2019/0111546 A1    Apr. 18, 2019

(30) Foreign Application Priority Data

Oct. 17, 2017   (CN) .......................... 2017 1 0967368

(51) Int. Cl.
| | |
|---|---|
| *B25B 11/00* | (2006.01) |
| *B23Q 3/08* | (2006.01) |
| *B23Q 3/04* | (2006.01) |
| *B25B 11/02* | (2006.01) |

(52) U.S. Cl.
CPC .............. *B25B 11/005* (2013.01); *B23Q 3/04* (2013.01); *B23Q 3/088* (2013.01); *B25B 11/02* (2013.01)

(58) Field of Classification Search
CPC ....... B25B 11/00; B25B 11/005; B25B 11/02; B23Q 3/04; B23Q 3/08; B30B 15/287; B30B 9/3028; B30B 15/007
USPC ........... 269/254 CS, 71, 43, 45, 55; 100/219
See application file for complete search history.

(56) References Cited

U.S. PATENT DOCUMENTS 3,142,380 A * 7/1964 Griesinger ............ B21C 23/218
100/219

FOREIGN PATENT DOCUMENTS

| CN | 201119268 | 9/2008 |
| CN | 201119268 Y * | 9/2008 |

OTHER PUBLICATIONS

Translation (Year: 2008).*

* cited by examiner

*Primary Examiner* — Tyrone V Hall, Jr.
*Assistant Examiner* — Abbie E Quann
(74) *Attorney, Agent, or Firm* — ScienBiziP, P.C.

(57) ABSTRACT

A fixing structure includes a base, a supporting assembly coupled to the base, a top cover rotationally coupled to the supporting assembly, and a limiting assembly arranged on the supporting assembly. The limiting assembly limits a rotation angle of the top cover relative to the base.

8 Claims, 5 Drawing Sheets

FIXING STRUCTURE

CROSS-REFERENCE TO RELATED APPLICATIONS

This application claims priority to Chinese Patent Application No. 201710967368.9 filed on Oct. 17, 2017, the contents of which are incorporated by reference herein.

FIELD

The subject matter herein generally relates to a fixing structure, and more particularly to a fixing structure for fixing an angle of opening a workpiece.

BACKGROUND

Generally, during assembly of a workpiece, the workpiece needs to be open. When the workpiece is an electronic device, a process of assembling the workpiece includes assembling the wiring of the workpiece, and a cover of the workpiece may not stay open at a desired angle.

BRIEF DESCRIPTION OF THE DRAWINGS

Implementations of the present disclosure will now be described, by way of example only, with reference to the attached figures.

DETAILED DESCRIPTION

Figure 1:
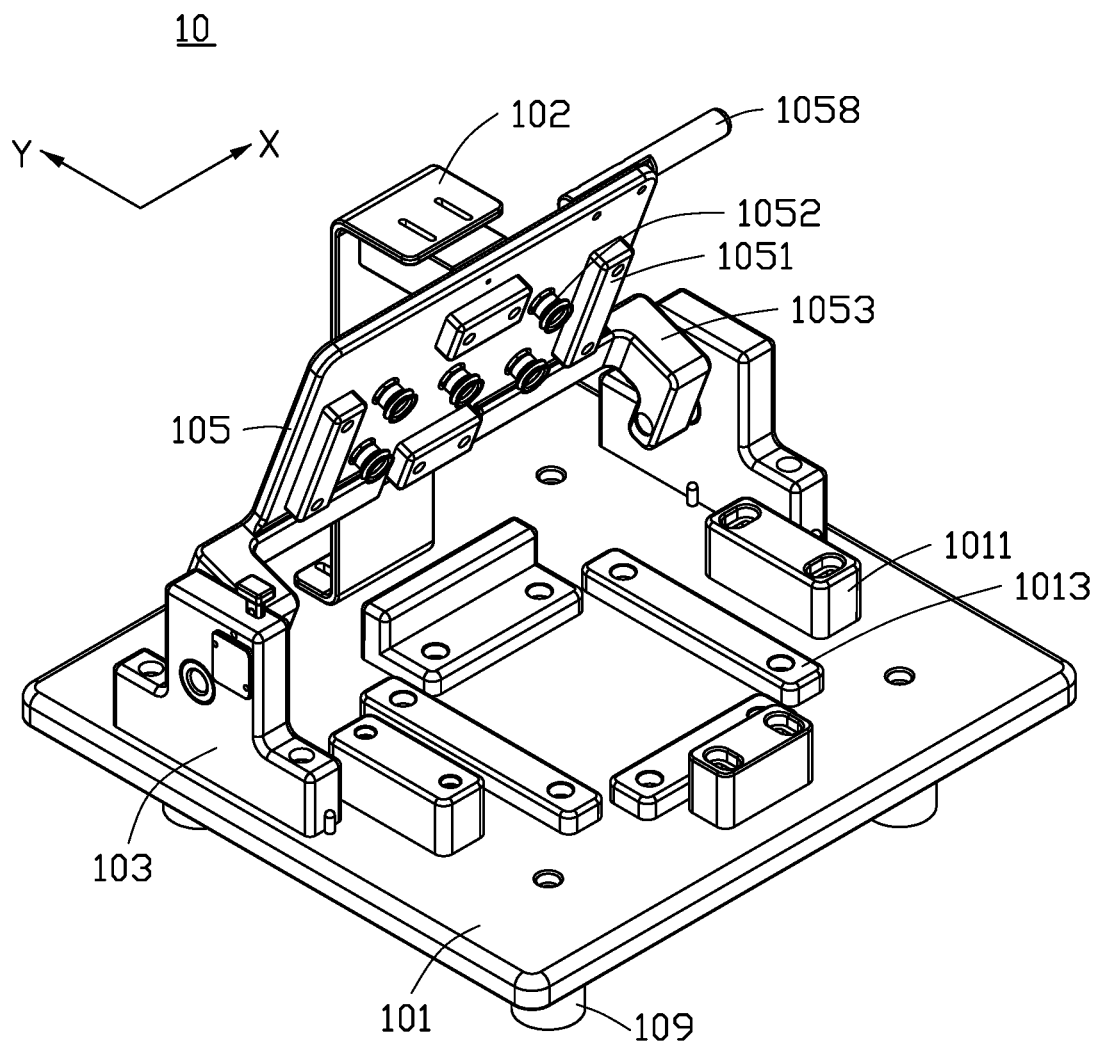
FIG. 1 is an assembled, isometric view of an exemplary embodiment of a fixing structure in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of a fixing structure 10. The fixing structure 10 is used for supporting and fixing a workpiece.

The fixing structure 10 includes at least a base 101, a supporting assembly 103, and a top cover 105. The base 101 is used for supporting the workpiece thereon. In at least one embodiment, the base 101 is substantially rectangular.

The base 101 includes at least one limiting block 1011 to limit movement of the workpiece on the base 101. In at least one embodiment, the limiting block 1011 is substantially rectangular. In the illustrated embodiment, there are two limiting blocks 1011, and the workpiece is placed between the two limiting blocks 1011 to limit a movement of the workpiece along a first direction. In another embodiment, in order to further limit movement of the workpiece, two more limiting blocks 1011 can be arranged on opposite sides of the workpiece along a second direction to limit movement of the workpiece along the second direction. The first direction is substantially perpendicular to the second direction. In at least one embodiment, the first direction is an X-axis direction, and the second direction is a Y-axis direction.

In at least one embodiment, the base 101 further includes a separating block 1013. The separating block 1013 is arranged within a space surrounded by the limiting blocks 1011. The workpiece is placed on the separating block 1013 to separate the workpiece from the base 101, thereby preventing static electricity between the workpiece and the base 101.

The supporting assembly 103 is coupled between the base 101 and the top cover 105. The supporting assembly 103 is arranged on a surface of the base 101 where the limiting blocks 1011 are arranged. The top cover 105 is rotationally coupled to the supporting assembly 103. In at least one embodiment, the fixing structure 10 includes two supporting assemblies 103. The two supporting assemblies 103 are oppositely arranged and are adjacent to the limiting blocks 1011 along the first direction, such that an axis of rotation of the top cover 105 is along the first direction.

Figure 2:
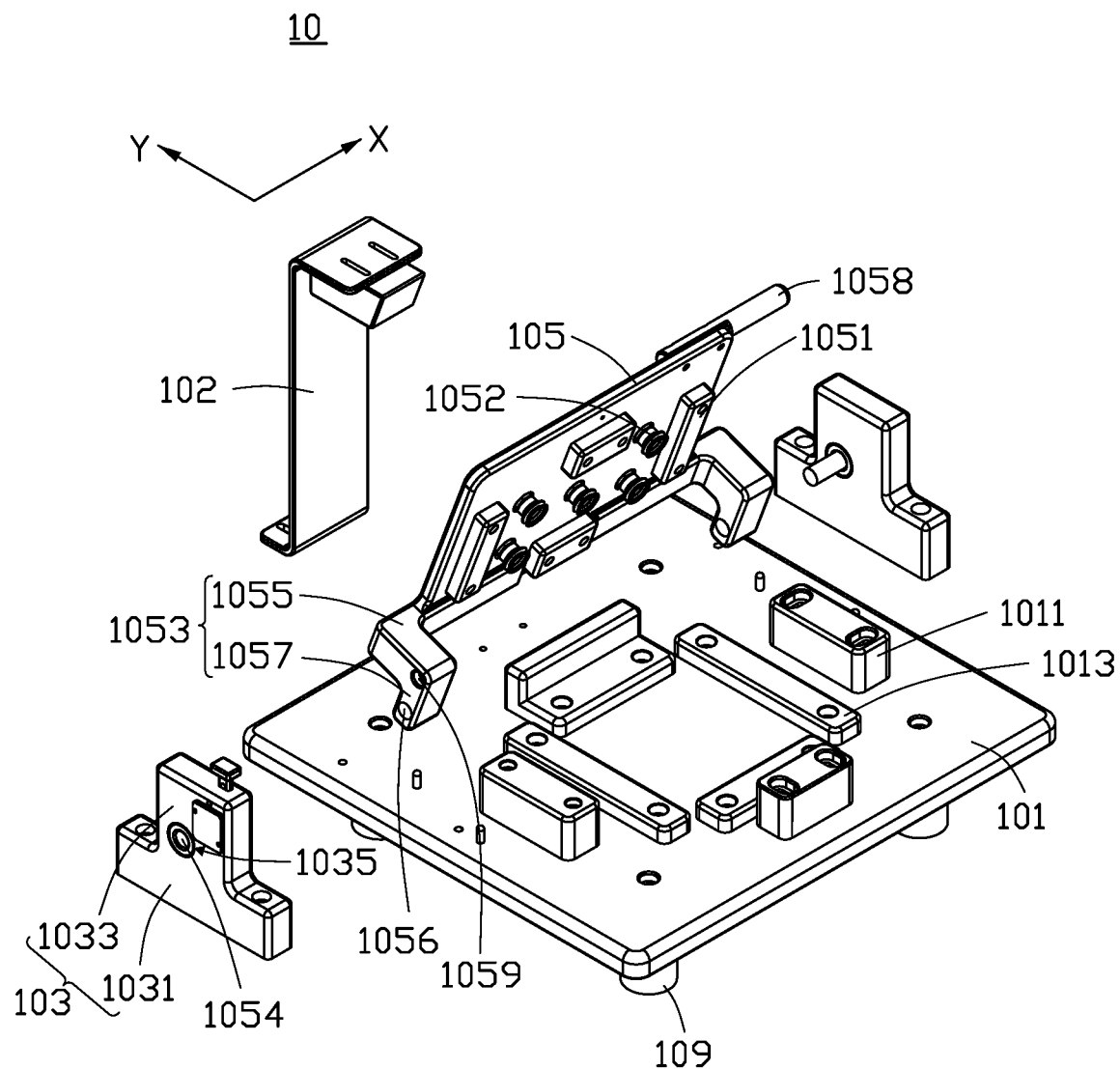
FIG. 2 is an exploded, isometric view of the fixing structure in FIG. 1.

Referring to FIG. 2, the supporting assembly 103 includes a main body 1031 and a protruding portion 1033. A cross-section of the supporting assembly 103 is substantially T-shaped. The main body 1031 and the protruding portion 1033 are integrally formed. The main body 1031 is substantially rectangular. The main body 1031 is fixed to the base 101. The protruding portion 1033 is perpendicular to the main body 1031. The protruding portion 1033 is substantially rectangular. A mounting hole 1035 is defined in the protruding portion 1033. The top cover 105 is rotationally coupled to the supporting assembly 103 through the mounting hole 1035.

In another embodiment, the two supporting assemblies 103 can be adjacent to the limiting blocks 1011 along the second direction, such that an axis of rotation of the top cover 105 is along the second direction.

The top cover 105 is used to fix the workpiece in place. In at least one embodiment, the top cover 105 is substantially rectangular. The top cover 105 includes fixing blocks 1051 on a surface facing the base 101. The fixing blocks 1051 are substantially rectangular. The fixing blocks 1051 are arranged corresponding to a periphery of the workpiece such that the fixing blocks 1051 closely abut the workpiece, thereby fixing the workpiece in place. A number of the fixing blocks 1051 is at least two. The two fixing blocks 1051 are oppositely arranged, and the workpiece is arranged between the fixing blocks 1051, such that workpiece is fixed in place along the first direction. To further fix in place the workpiece, two more fixing blocks 1051 can be oppositely arranged to fix the workpiece in place along the second direction.

The top cover 105 further includes suction nozzles 1052. The suction nozzles 1052 are used for helping the top cover 105 to adhere to the workpiece. The suction nozzles 1052 are arranged in a space surrounded by the fixing blocks 1051.

An edge of the top cover 105 includes connecting pieces 1053. The connecting pieces 1053 rotationally couple the top cover 105 to the supporting assemblies 103.

In at least one embodiment, the connecting piece 1053 includes an extending portion 1055 and a mounting section 1057. The extending portion 1055 and the mounting section 1057 are integrally formed. A cross-section of the connecting piece 1053 is substantially L-shaped. The mounting section 1057 is on a side of the extending portion 1055 away from the top cover 105. A receiving hole 1056 is defined in an end of the mounting section 1057 away from the extending portion 1055. The receiving hole 1056 corresponds to the mounting hole 1035. A mounting piece 1054, such as a screw, passes through the mounting hole 1035 and is screwed into the receiving hole 1056, thereby rotationally coupling the top cover 105 to the supporting assemblies 103.

In at least one embodiment, the top cover 105 further includes a handle 1058 arranged on the top cover 105. The handle 1058 can be used to rotate the top cover 105.

Figure 3:
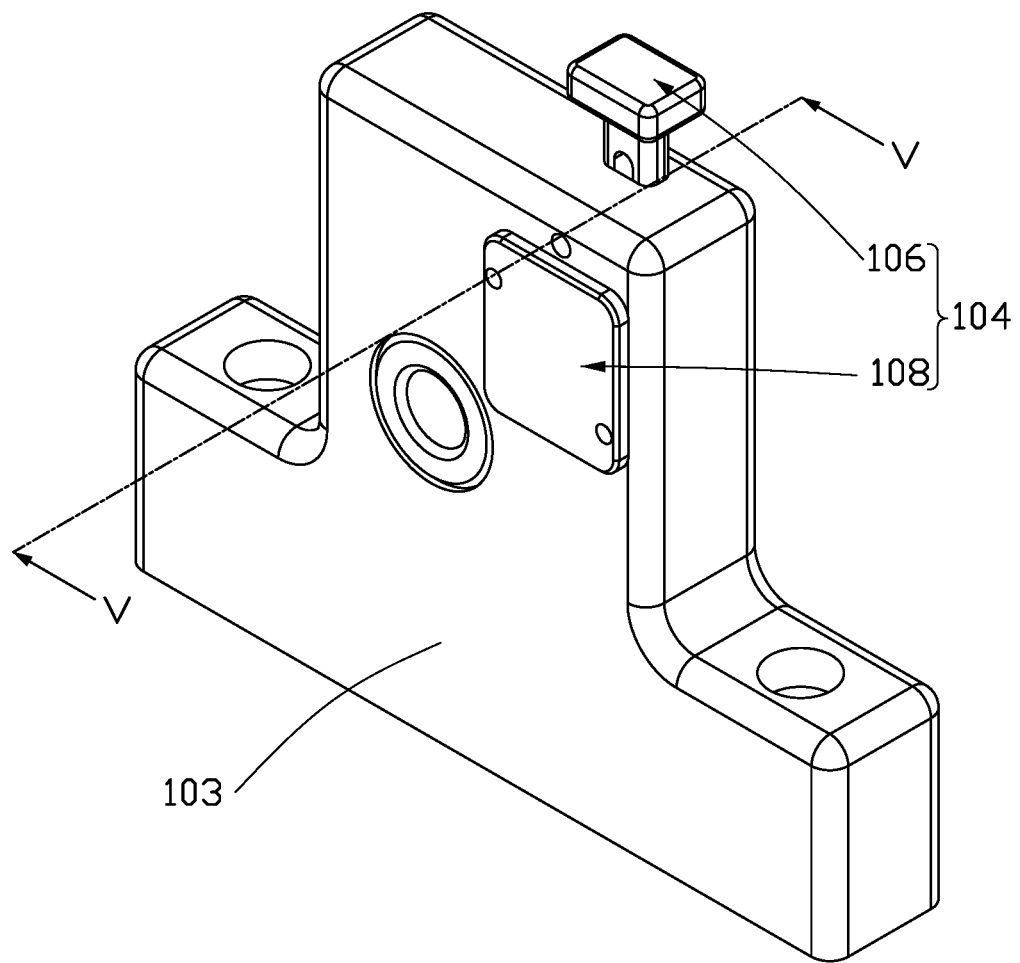
FIG. 3 is an isometric view of a supporting assembly of the fixing structure.

Referring to FIG. 3, the fixing structure 10 further includes a limiting structure 104. The limiting structure 104 is arranged on the supporting structure 103 to limit a rotation angle of the top cover 105. In at least one embodiment, the limiting structure 104 is only arranged on one of the supporting structures 103. The protruding portion 1033 is substantially hollow, and a portion of the limiting structure 104 is received in the protruding portion 1033. In another embodiment, the limiting structure 104 can be arranged on both of the supporting assemblies 103.

In at least one embodiment, the limiting structure 104 includes a lever assembly 106 and a limiting assembly 108 corresponding to the lever assembly 106.

Figure 4:
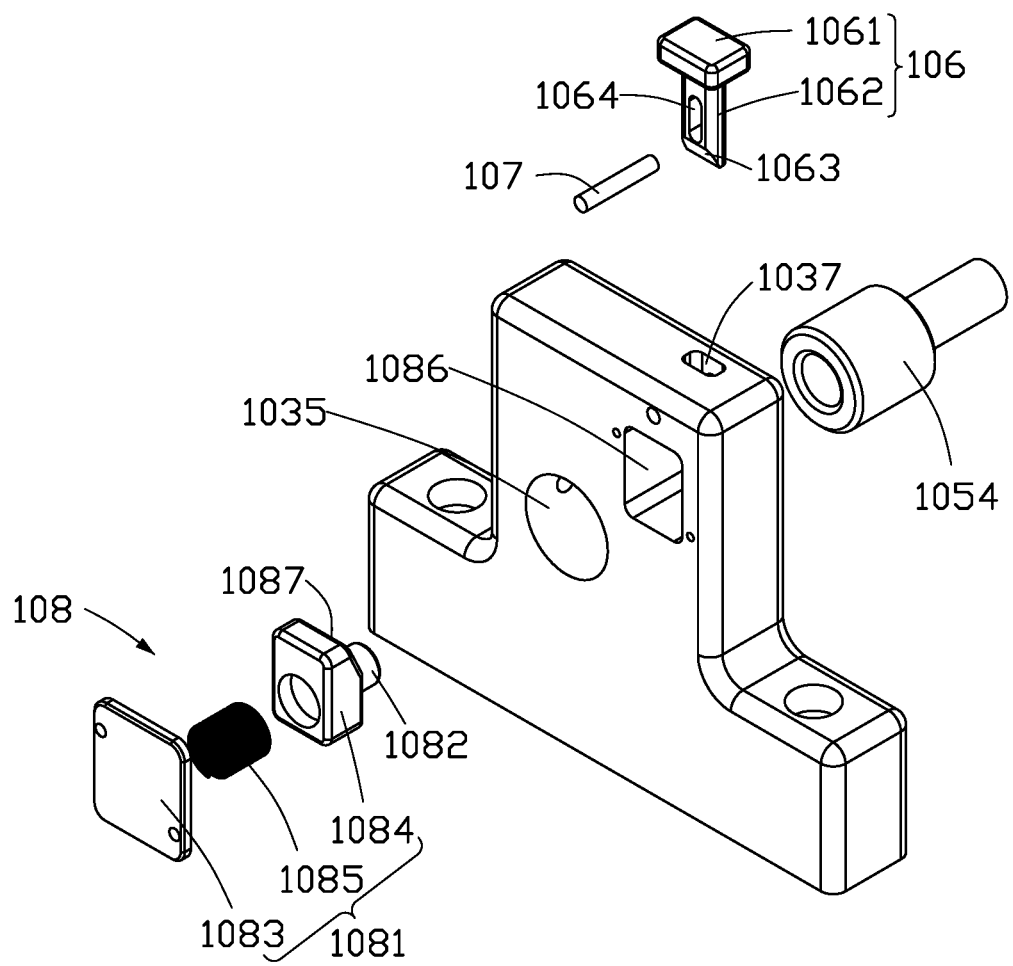
FIG. 4 is an exploded view of the supporting assembly.

Referring to FIG. 4, the lever assembly 106 includes a head portion 1061 and an operating portion 1062. The head portion 1061 is a block-shaped structure, and the operating portion 1062 is a rod-shaped structure. The operating portion 1062 is perpendicular to the head portion 1061. A bottom end 1063 of the operating portion 1062 away from the head portion 1061 is wedge-shaped.

The operating portion 1062 is received within the protruding portion 1033, and a portion of the operating portion 1033 protrudes out of the protruding portion 1033. In detail, an assembly hole 1037 is defined in a top of the protruding portion 1033. The operating portion 1062 is movably received within the protruding portion 1033 through the assembly hole 1037. The head portion 1061 is larger than a width of the hole 1061 and is outside of the assembly hole 1037 in order to prevent the lever assembly 106 from falling into the protruding portion 1033.

A chute 1064 is defined in the operating portion 1062. Correspondingly, the fixing structure 10 includes a fixing rod 107. The fixing rod 107 is substantially round. The fixing rod 107 is received in the protruding portion 1033 and received in the chute 1064. In this way, when the head portion 1061 is pulled, the operating portion 1062 follows the head portion 1061 and can move within a range of the chute 1064 relative to the fixing rod 107.

The limiting assembly 108 includes a connecting portion 1081 and a limiting portion 1082. The connecting portion 1081 couples the limiting portion 1082 to the protruding portion 1033. In detail, the connecting portion 1081 includes a first pressing block 1081, a second pressing block 1084, and a resilient member 1085.

The first pressing block 1083 is arranged on a sidewall of the protruding portion 1033. A first through hole 1086 for receiving the limiting assembly 108 is defined in the sidewall of the protruding portion 1033. The first pressing block 1083 is used for covering the first through hole 1086 and is fixed on the sidewall of the protruding portion 1033. The first pressing block 1083 may be fixed on the sidewall of the protruding portion 1033 by screws, for example.

The second pressing block 1084 corresponds to the bottom end 1063 of the operating portion 1062. The second pressing block 1084 includes a matching surface 1087 corresponding to the bottom end 1063. The matching surface 1087 is an inclined surface.

In at least one embodiment, the resilient member 1085 is a spring and is between the first pressing block 1083 and the second pressing block 1084. Thus, the resilient member 1085 resiliently couples the second pressing block 1084 to the first pressing block 1083.

Figure 5:
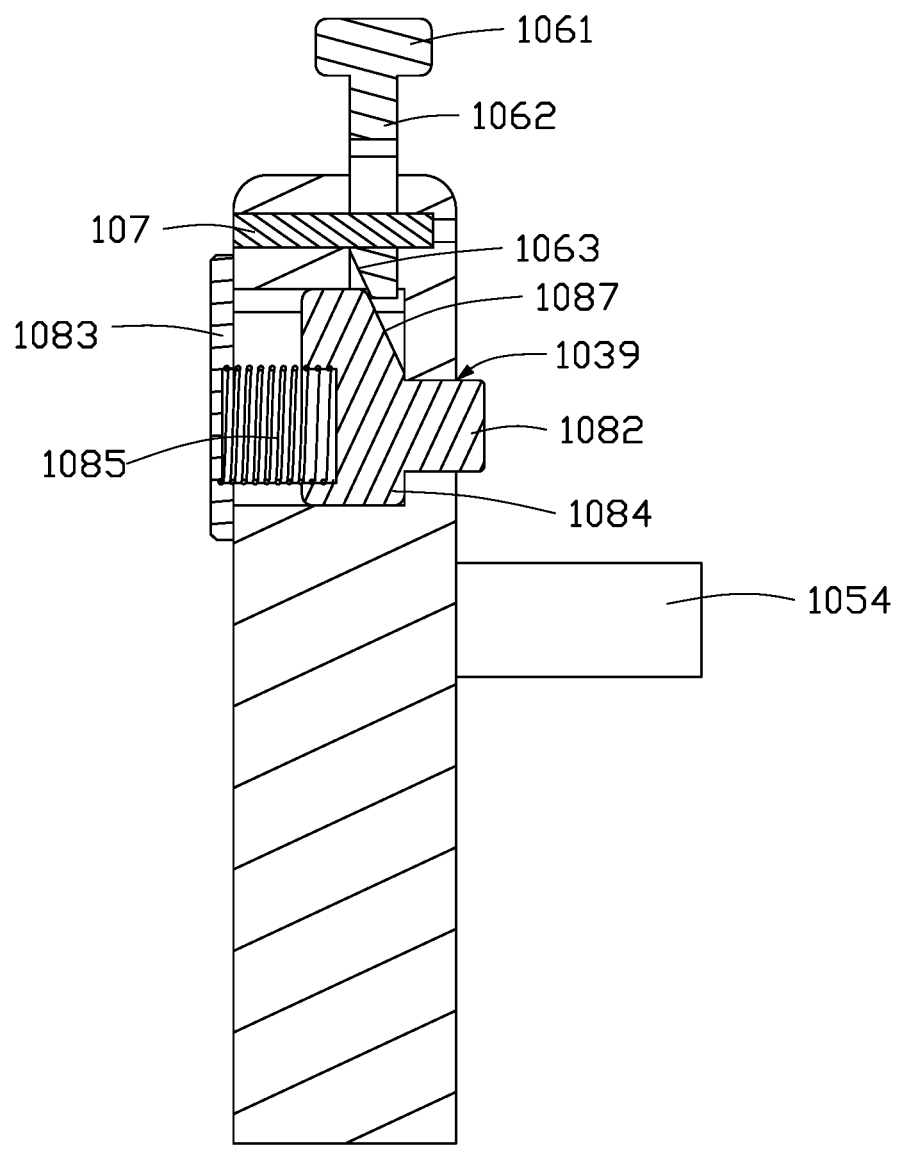
FIG. 5 is a cross-sectional view of the supporting structure taken along line V-V of FIG. 3.

Referring to FIG. 5, when the head portion 1061 is pressed, the bottom end 1063 of the operating portion 1062 moves toward the second pressing block 1084. The bottom end 1063 moves toward the second pressing block 1084 until the bottom end 1063 contacts the matching surface 1087. Then, the bottom end 1063 presses the matching surface 1087, which causes the second pressing block 1084 to move toward the first pressing block 1083 (along the first direction). In this state, the resilient member 1085 is compressed. When the head portion 1061 is pulled, the bottom end 1063 of the operating portion 1062 moves away from the second pressing block 1084 until the bottom end 1063 moves away from the matching surface 1087. Then, the resilient member 1085 restores to move the second pressing block 1084 away from the first pressing block 1083.

The limiting portion 1082 limits the rotation angle of the top cover 105. In at least one embodiment, the limiting portion 1082 is arranged on a surface of the second pressing block 1084 away from the resilient member 1085. The limiting portion 1082 is substantially round, but in other embodiments, the limiting portion 1082 can be other shapes. The limiting portion 1082 is perpendicular to the second pressing block 1084. The protruding portion 1033 defines a second through hole 1039 corresponding to the limiting portion 1082. The limiting portion 1082 can protrude out of the protruding portion 1033 through the second through hole 1039.

In at least one embodiment, a slot 1059 is defined in a junction of the mounting section 1057 and the extending portion 1055 (shown in FIG. 2). The slot 1059 corresponds to the limiting portion 1082.

When the head portion 1061 is pressed, the bottom end 1063 of the operating portion 1062 moves toward the second pressing block 1084. The bottom end 1063 moves toward the second pressing block 1084 until the bottom end 1063 contacts the matching surface 1087. Then, the bottom end 1063 presses the matching surface 1087, which causes the second pressing block 1084 to move toward the first pressing block 1083. In this state, the resilient member 1085 is compressed, the limiting portion 1082 is not received in the second through hole 1039, and the top cover can rotate freely. When the head portion 1061 is pulled, the bottom end 1063 of the operating portion 1062 moves away from the second pressing block 1084 until the bottom end 1063 moves away from the matching surface 1087. Then, the resilient member 1085 restores to move the second pressing block 1084 away from the first pressing block 1083, and the limiting portion 1082 is received into the second through hole 1039 to fix the angle of the top cover 105 relative to the base 101.

The fixing structure 10 further includes a limiting column 102. The limiting column 102 is substantially Z-shaped. The limiting column 102 limits a rotation angle of the top cover 105 to prevent the top cover 105 from rotating at too large an angle.

Furthermore, the fixing structure 10 further includes supporting members 109. The supporting portions 109 are arranged at four corners on a bottom surface of the base 101 to support the base 101. In at least one embodiment, the supporting members 109 are made of rubber.

The supporting assemblies 103 are coupled between the base 101 and the top cover 105. The top cover 105 is rotationally coupled to the supporting assemblies 103 to rotate relative to the base 101. In addition, the supporting assemblies 103 include the limiting structure 104. The limiting structure 104 and the slot 1059 cooperatively control the rotation angle of the top cover 105 relative to the base 101, thereby controlling an opening and closing angle of the workpiece. The fixing structure 10 is a simple structure and is easy to use, thereby saving manpower.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A fixing structure comprising:
   a base;
   a supporting assembly coupled to the base;
   a top cover rotationally coupled to the supporting assembly; and
   a limiting structure arranged on the supporting assembly for limiting a rotation angle of the top cover relative to the base;
   wherein the supporting assembly comprises a main body and a protruding portion; the main body is coupled to the base; the protruding portion is perpendicularly coupled to the main body;
   the limiting structure is arranged on the protruding portion; a mounting hole is defined in the protruding portion; the top cover is rotationally coupled to the supporting assembly through the mounting hole;
   wherein the limiting structure comprises a lever assembly and a limiting assembly; the lever assembly is movably coupled to the supporting assembly; the lever assembly cooperates with the limiting assembly; the lever assembly controls the limiting assembly to move along a first direction to limit a movement of the top cover relative to the base;
   wherein the lever assembly comprises a head portion and an operating portion; the operating portion is perpendicularly coupled to the head portion; an end of the operating portion is wedge-shaped;
   wherein the limiting assembly comprises a connecting portion and a limiting portion; the connecting portion comprises a first pressing block, a second pressing block, and a resilient member; the first pressing block is fixed to the protruding portion; the resilient member is coupled between the first pressing block and the second pressing block; the limiting portion is arranged on the second pressing block.

2. The fixing structure of claim 1, wherein the protruding portion is hollow.

3. The fixing structure of claim 1, further comprising a fixing rod;
   wherein a chute is defined in a side of the operating portion; the fixing rod is received in the chute to movably couple the lever assembly within the protruding portion.

4. The fixing structure of claim 1, wherein the second pressing block comprises a matching surface corresponding to the bottom end of the operating portion; a structure of the matching surface matches a structure of the bottom end; the bottom end acts on the matching surface to move the limiting portion along the first direction, thereby limiting the rotation angle of the top cover relative to the base.

5. The fixing structure of claim 4, wherein the top cover comprises a connecting piece for rotationally coupling the top cover to the supporting assembly; a slot is defined in the connecting piece; the limiting portion is received in the slot to limit the rotation angle of the top cover relative to the base.

6. The fixing structure of claim 1, wherein the base comprises at least two limiting blocks arranged opposite to each other to limit movement of a workpiece on the base.

7. The fixing structure of claim 1, further comprising a limiting column arranged on the base for limiting a rotation angle of the top cover relative to the base.

8. A fixing structure comprising:
   a base;
   a supporting assembly coupled to the base;
   a top cover rotationally coupled to the supporting assembly; and
   a limiting structure arranged on the supporting assembly for limiting a rotation angle of the top cover relative to the base;
   wherein the supporting assembly comprises a main body and a protruding portion; the main body is coupled to the base; the protruding portion is perpendicularly coupled to the main body; the limiting structure is arranged on the protruding portion; a mounting hole is defined in the protruding portion; the top cover is rotationally coupled to the supporting assembly through the mounting hole;
   wherein the limiting structure comprises a lever assembly and a limiting assembly, the limiting assembly comprises a connecting portion and a limiting portion; the connecting portion comprises a first pressing block, a second pressing block, and a resilient member; the first pressing block is fixed to the protruding portion; the resilient member is coupled between the first pressing block and the second pressing block; the limiting portion is arranged on the second pressing block.

* * * * *